United States Patent [19]

Tentler

[11] Patent Number: 4,489,347

[45] Date of Patent: Dec. 18, 1984

[54] SINE-WAVE DECODING TECHNIQUE

[75] Inventor: Michael Tentler, Prospect Heights, Ill.

[73] Assignee: Zenith Radio Corporation, Glenview, Ill.

[21] Appl. No.: 413,003

[22] Filed: Aug. 30, 1982

[51] Int. Cl.³ .......................... H04N 7/16; H04N 1/02
[52] U.S. Cl. ..................................... 358/118; 331/20; 358/120; 375/120
[58] Field of Search ............... 358/118, 120; 375/120; 331/20

[56] References Cited

U.S. PATENT DOCUMENTS

| | | | |
|---|---|---|---|
| 3,081,376 | 3/1963 | Loughlin et al. | 178/5.1 |
| 3,729,576 | 4/1973 | Court | 178/5.1 |
| 4,024,575 | 5/1977 | Harney et al. | 358/121 |
| 4,105,975 | 8/1978 | Sanders et al. | 375/120 |
| 4,338,628 | 7/1982 | Payne et al. | 358/120 |
| 4,398,215 | 8/1983 | Osaka | 358/120 |
| 4,443,769 | 4/1984 | Achwanden et al. | 331/20 |

Primary Examiner—S. C. Buczinski

[57] ABSTRACT

A decoder includes an oscillator supplying a decoding signal to the control input of an RF modulator for decoding a sine wave encoded television signal. The decoding signal developed by the oscillator is randomly phase locked in either of two states with the output of a horizontal sync separator operated in response to the detected output of the RF modulator. In the first phase locked state, the decoding signal is in antiphase relationship with the encoding modulation resulting in a properly decoded baseband video signal. In the second phase locked state, the decoding signal is in phase alignment with the encoding modulation so as to constructively combine therewith. The second phase locked state is detected and broken each time it is assumed allowing the decoder to eventually assume the first phase locked state wherein a properly decoded video signal is produced.

6 Claims, 5 Drawing Figures

SINE-WAVE DECODING TECHNIQUE

BACKGROUND OF THE INVENTION

The present invention relates generally to subscription television signal decoders and, more particularly, to an improved decoder for unscrambling a sine-wave encoded television signal.

In subscription television systems, television signals are typically transmitted to system subscribers in a scrambled or encoded form either along a coaxial cable or as an "over-the-air" broadcast. Each system subscriber is provided with a decoder operable for unscrambling or decoding the transmitted television signal and for supplying the unscrambled signal to a standard television receiver for viewing.

A relatively common technique for scrambling or encoding a subscription television signal contemplates the application of a sine wave signal as additional amplitude modulation to the composite television signal. The frequency of the encoding sine wave signal is normally equal to the horizontal scan rate (approximately 15.75 KHz), although other integral multiples thereof are sometimes used, and is phased locked to the horizontal sync such that the resulting sine wave modulation has the effect of suppressing horizontal sync and enhancing the video between horizontal sync pulses. U.S. Pat. Nos. 3,081,376 to Loughlin et al, 3,729,576 to Court and 4,024,575 to Harney et al are exemplary of such subscription television sine wave encoding systems.

In order to decode the transmitted sine wave encoded television signal, it is known to amplitude modulate the audio carrier of the television signal with a complementary decoding sine wave signal. The decoding sine wave signal is recovered from the audio carrier by the decoder and applied to the video signal to cancel the encoding sine wave amplitude modulation for reconstituting the television signal in an unscrambled form. For example, in the referent Loughlin et al patent, the decoding sine wave signal is recovered from the audio carrier by a narrow band detector and applied to an RF modulator for cancelling the encoding sine wave modulation from the video signal. Similarly, in the Court patent the decoding sine wave signal is recovered from the audio carrier by narrow band intermediate frequency filters and applied through a 15.75 KHz tuned amplifier to a decoding modulator for cancelling the encoding modulation. In the Harney et al system, the decoding sine wave signal is recovered from the residual modulation characterizing the audio carrier after it and the video carrier have been processed by an RF amplifier whose gain is controlled by the decoding signal.

All of the foregoing prior art systems are characterized in that the decoding signal is recovered from amplitude modulation of the audio carrier. This common prior art approach suffers from the disadvantage that relatively expensive and critically designed audio recovery circuits are necessary to recover the decoding signal from the audio carrier. In addition, increased circuit complexity and expense are required at the transmitter to properly modulate the audio carrier with the correct phase decoding signal.

It is accordingly a basic object of the present invention to provide an improved decoder for decoding or unscrambling a sine wave encoded television signal.

It is a more specific object of the invention to provide a decoder for decoding a sine wave encoded television signal wherein a decoding sine wave signal is derived independently of the audio carrier.

BRIEF DESCRIPTION OF THE DRAWINGS

Features of this invention which are believed to be novel are set forth with particularity in the appended claims. The invention, together with its objects and the advantages thereof, may best be understood by reference to the following description taken in conjunction with the accompanying drawings in which:

DESCRIPTION OF THE PREFERRED EMBODIMENT

Figure 2A:
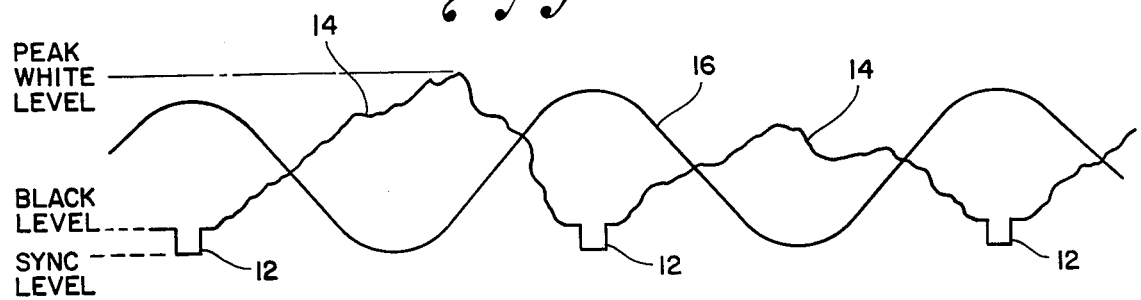
FIGS. 2A-2D are a series of signal waveforms illustrating the operation of the decoder circuit of FIG. 1.

Referring initially to FIG. 2A, a standard composite video signal comprises a plurality of horizontal synchronizing pulses 12 occurring at the horizontal line scan rate of approximately 15.75 KHz for synchronizing the horizontal scan of a television receiver separated by a video signal 14 defining a plurality of lines of video information. The horizontal sync pulses 12 extend beyond black level to a so-called "blacker-than-black" sync level to enable detection thereof by the sync separating circuits of a standard television receiver while the video signal 14 undergoes excursions between black level and a peak white level in accordance with the content of a televised image. The composite video signal is used to amplitude modulate a picture carrier for transmission to a receiving site having a standard television receiver.

Figure 2B:
Figure 2C:
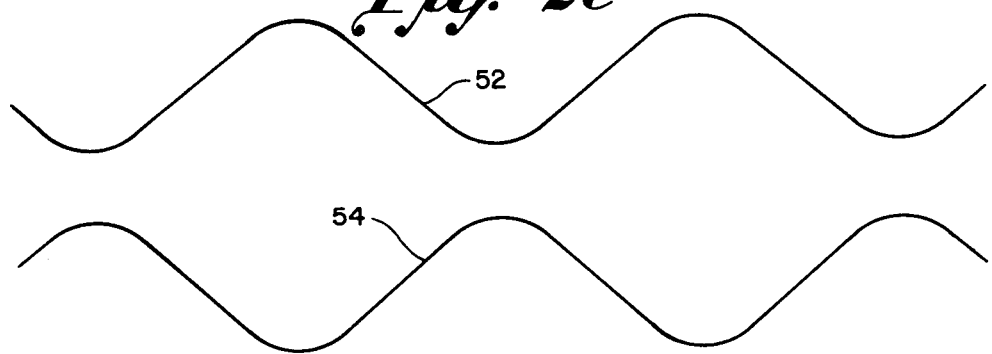

In a subscription television system, the composite video signal is typically encoded or scrambled prior to transmission to withhold the video content from unauthorized viewers. A relatively common technique for scrambling the video signal is known as sine wave encoding which comprises the use of an encoding sine wave signal 16, to amplitude modulate the video signal. The encoding sine wave 16 which has a frequency equal to the horizontal scan rate of 15.75 KHz and is phase locked to the horizontal sync signal, is phased in relation to the composite video signal as illustrated in FIG. 2A for producing suppressed horizontal sync pulses 12A and enhanced video signal lines 14A therebetween as shown in FIG. 2B. Since the horizontal pulses 12A are translated to a level within the normal range of the video signal, the synchronizing circuits of a standard television receiver which detect horizontal sync by sensing the blackest level of the composite video signal will be unable to detect the suppressed sync pulses 12A for achieving a properly synchronized raster. As a result, a scrambled video image characterized by a lack of horizontal synchronization will be produced on the viewing screen of the standard television receiver.

In order to unscramble the sine wave encoded video signal of FIG. 2B, it has been common practice to transmit a complementary sine wave decoding signal as amplitude modulation of the audio carrier and to recover this decoding signal from the audio carrier in a suitable decoder. The recovered decoding sine wave signal is then typically applied to an RF modulator in antiphase relationship with the encoding modulation to cancel the latter modulation from the composite video signal. The transmitted signal is thereby unscrambled and may now be applied to a standard television receiver for viewing.

While the foregoing decoding technique provides generally satisfactory performance, there are a number of disadvantages associated with recovering the decoding signal from the audio carrier as described. These disadvantages are overcome according to the present invention by providing a decoder which generates a properly phased sine wave decoding signal independently of the audio carrier for cancelling the encoding modulation of a sine wave encoded television signal.

Figure 1:
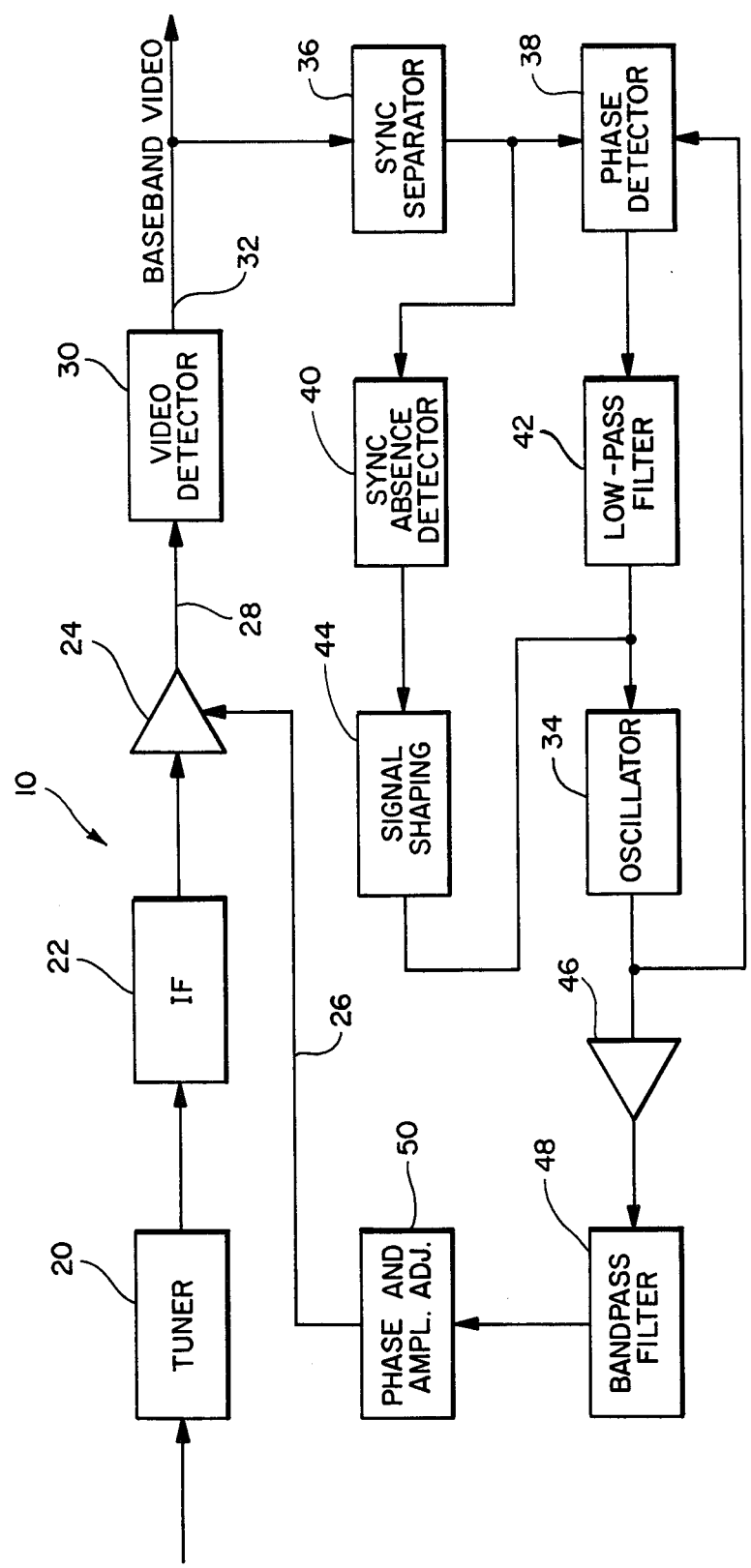
FIG. 1 is a block diagram illustrating the construction of a circuit according to the invention for decoding a sine wave encoded television signal.

The decoder of the invention is shown in block diagram form in FIG. 1. The decoder includes a tuner 20 which converts a selected RF television signal to a fixed intermediate frequency signal for processing by a conventional intermediate frequency stage 22. The output of intermediate frequency stage 22 is coupled to an RF modulator 24 which receives at its control input a decoding signal from a conductor 26. When the decoding signal on conductor 26 is precisely in antiphase relationship with the encoding modulation characterizing the received television signal, modulator 24 will be operated for cancelling the encoding modulation whereby an unscrambled or decoded intermediate frequency signal will be developed on output conductor 28. The unscrambled intermediate frequency signal is supplied to a video detector 30 which demodulates the decoded intermediate frequency signal for developing a composite baseband video signal on an output conductor 32. This baseband video signal may be applied to a modulator (not shown) for amplitude modulating a standard RF picture carrier to facilitate coupling of the signal to the antenna input terminals of a standard television receiver.

The decoding signal developed on conductor 26 is derived by phase locking the output of an oscillator 34 to the horizontal sync component of the composite baseband video signal developed on conductor 32. More specifically, the composite baseband video signal developed on conductor 32 is applied to a conventional sync separator 36 which normally operates to separate the horizontal sync pulses from the composite video signal. This function is accomplished by sampling the composite video signal at a threshold level near the blacker-than-black sync level normally occupied only by the sync pulses. The output of sync separator 36 is coupled to one input of a phase detector 38 and to the input of a sync absence detector 40. Sync absence detector 40 is a conventional circuit which produces an output having a first level when the output of sync separator 36 is characterized by normal horizontal sync pulses 12 and otherwise having a second level.

The output of phase detector 38 is applied through a low-pass filter 42 to the input of voltage controlled oscillator 34 whose output is in turn fed back to a second input of phase detector 38. Oscillator 36, sync separator 36, phase detector 38, sync absence detector 40 and low-pass filter 42 are all conventional circuits commonly found in modern television receivers. For example, all of these circuits may be found in Zenith Radio Corporation "Sync Scan Processor" integrated circuit IC 1351 and associated components.

The decoder of FIG. 2 further includes a signal level detector and shaping circuit 44 connected between the output of sync absence detector 40 and the input of oscillator 34. The output of oscillator 34, in addition to being fed back to phase detector 38, is coupled through an amplifier 46, a bandpass filter 48 and a phase and amplitude adjustment circuit 50.

As will be explained in further detail below, the output of oscillator 34 comprises a sequence of horizontal rate pulses which are phased locked to the horizontal sync component of the composite baseband video signal developed on conductor 32. These horizontal rate pulses are amplified by amplifier 46 and filtered by bandpass filter 48 to produce a sine wave decoding signal 52 (see FIG. 2C) which is in antiphase relation with the encoding modulation of the composite video signal. This sine wave decoding signal is then applied by conductor 26 to modulator 24 for cancelling the sine wave amplitude modulation from the intermediate frequency video signal.

More specifically, the output of oscillator 34, which is selected to free-run at a frequency near the horizontal scan rate of 15.75 KHz, is phase compared with the horizontal output of sync separator 36 by phase detector 38. Thus, when decoder 10 is initially turned on, a sine wave decoding signal having a random phase is applied to the control input of modulator 24 by conductor 26 for amplitude modulating the sine wave encoded intermediate frequency signal. The demodulated output of video detector 30 therefore comprises a baseband signal characterized by the original sine wave encoding modulation as modified by the random phase decoding modulation developed on conductor 26. This demodulated baseband signal is sampled near the sync level by sync separator 36 and compared in phase with the output of oscillator 34 by phase detector 38. Phase detector 38 will apply a control signal through low-pass filter 42 for varying the phase and frequency of oscillator 34 until a stable 15.75 KHz component is developed at the output of sync separator 36 which is in phase with the output of oscillator 34 for locking the phase lock loop. A sufficiently stable 15.75 KHz component for locking the phase lock loop will be developed at the output of sync separator 36 only under two conditions; namely, (1) when the decoding signal developed on conductor 26 is in antiphase relation with the encoding modulation as illustrated by wave 52 of FIG. 2C wherein the baseband output of video detector 30 includes a normal 15.75 KHz horizontal sync component and (2) when the decoding signal developed on conductor 26 is in phase alignment with the encoding modulation as illustrated by wave 54 of FIG. 2C. In the latter situation, the phase aligned encoding modulation wave 16 and decoding wave 54 constructively combine to produce a baseband signal at the output of video detector 30 as illustrated by curve 56 of FIG. 2D which is characterized by a strong and stable 15.75 KHz component occurring at points 58 midway between the suppressed horizontal sync pulses 12B.

Figure 2D:
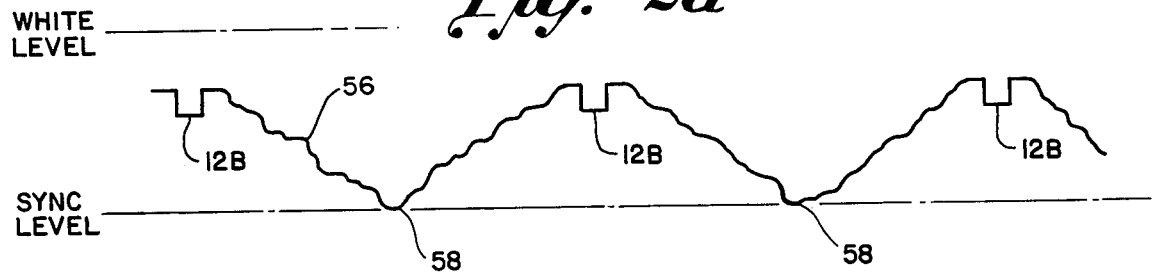

As explained above, upon initiating operation of decoder 10, the phase lock loop coupled between the output and control input of modulator 24 will lock in either one of two states on a purely random basis. In one of the two phase locked states the decoding signal developed on conductor 26 is in antiphase relation with the encoding modulation of the intermediate frequency signal so that a properly decoded baseband video signal is developed at the output of video detector 30. However, in the other possible phase locked state the decoding signal is in phase alignment with the encoding modulation and constructively combines therewith as illustrated in FIG. 2D to further distort the intermediate frequency signal and thereby the baseband video signal developed at the output of video detector 30. As discussed previously, this distorted baseband signal is characterized by a relatively stable 17.75 KHz non-sync component at the output of sync separator 36. This non-sync component is detected by sync absence detector 40 which develops an output control signal in response thereto, the output control signal being suitably shaped by signal shaping circuit 44 for application to the input of oscillator 34. The affect of applying the control signal output of sync absence detector 40 to the input of oscillator 34 is to momentarily displace the operating frequency of the oscillator such that the previously established phase locked state or condition is broken. Decoder 10 will then operate to re-establish one of the two aforementioned phase locked states. If the phase locked state wherein the decoding signal on conductor 26 is in phase alignment with the encoding modulation is again assumed, the operating frequency of oscillator 34 will again be momentarily displaced by the control signal output of sync absence detector 40 again breaking the locked condition. The foregoing will continue until the phase locked state is assumed wherein the decoding signal on conductor 26 is in antiphase relation with the encoding modulation. Decoder 10 will remain continuously locked in this state for producing a properly decoded composite baseband video signal at the output of video detector 30.

To summarize, upon initiating operation of decoder 10, a sine wave decoding signal is generated on conductor 26 in response to the output of oscillator 34, which decoding signal is forced to lock in either phase alignment with or in antiphase relation with the encoding sine wave modulation characterizing the broadcast subscription television signal. If the antiphase lock condition is assumed, a properly decoded composite baseband video signal is produced and no further circuit action is taken. However, if the phase alignment lock condition is assumed by the decoder, a control signal is developed breaking the locked condition. The decoder is thereby operated until the antiphase locl condition is assumed wherein a properly decoded composite baseband video signal is produced.

While there has been described a particular embodiment of the present invention, it will be apparent that changes and modifications may be made therein without departing from the invention in its broader aspects. For example, it will be appreciated that the decoder can be easily adapted for decoding signals wherein the sine wave encoding modulation has a frequency other than that of the horizontal scan rate. The aim of the appended claims, therefore, is to cover all such changes and modifications as fall within the true spirit and scope of the invention.

What is claimed is:

1. A circuit for decoding a television signal which is amplitude modulated by a sine wave encoding signal for suppressing horizontal sync intervals and enhancing video intervals, comprising:
   means for modulating the television signal with a decoding sine wave signal;
   means for detecting the baseband video signal characterizing the output of said modulating means;
   horizontal sync separator means for processing the detected baseband video signal;
   a phase lock loop including oscillator means having an output developing said decoding signal, said phase lock loop being responsive to the output of said horizontal sync separator means for assuming either a first locked state wherein the output of said oscillator means is locked in phase alignment with the encoding sine wave signal or a second locked state wherein the output of said oscillator means is locked in antiphase relationship with the encoding sine wave signal; and
   means causing the phase lock loop to break lock in response to the assumption thereby of said first locked state.

2. A decoding circuit according to claim 1 wherein said phase lock loop lock breaking means comprises means responsive to the output of said horizontal sync separator means for detecting the absence of a normal horizontal sync signal for momentarily displacing the operating frequency of said oscillator means.

3. A decoding circuit according to claim 1 wherein said phase lock loop comprises phase detector means responsive to the outputs of said horizontal sync separator means and said oscillator means for adjusting the operating characteristics of said oscillator means to establish said first and second locked states.

4. A decoding circuit according to claim 3 wherein said oscillator means has a free-running frequency approximately equal to the horizontal sync rate of said television signal.

5. A circuit for decoding a television signal which is amplitude modulated by a sine wave encoding signal for suppressing horizontal sync intervals and enhancing video intervals, comprising:
   means for modulating the television signal with a decoding sine wave signal;
   means for detecting the baseband video signal characterizing the output of said modulating means;
   horizontal sync separator means for processing the detected baseband video signal;
   a phase lock loop coupled between said horizontal sync separator means and said modulating means and including oscillator means having an output developing said decoding signal, said phase lock loop being responsive to the output of said horizontal sync separator means for assuming either a first locked state wherein the output of said oscillator means is locked in phase alignment with the encoding sine wave signal or a second locked state wherein the output of said oscillator means is locked in antiphase relationship with the encoding sine wave signal; and
   means responsive to the output of said horizontal sync separator means for detecting the absence of a normal horizontal sync signal for momentarily displacing the operating frequency of said oscillator means for causing the phase lock loop to break lock in response to the assumption thereby of said first locked state.

6. A circuit for decoding a television signal which is amplitude modulated by a sine wave encoding signal for suppressing horizontal sync intervals and enhancing video intervals, comprising:
   means for modulating the television signal with a decoding sine wave signal;
   means for detecting the baseband video signal characterizing the output of said modulating means;
   horizontal sync separator means for processing the detected baseband video signal;
   a phase lock loop including oscillator means developing said decoding signal and phase detector means, said phase detector means being responsive to the outputs of said horizontal sync separator means and said oscillator means for adjusting the operating characteristics of said oscillator means for causing said phase lock loop to assume either a first locked state wherein the output of said oscillator means is locked in phase alignment with the encoding sine wave signal or a second locked state wherein the output of said oscillator means is locked in anti-phase relationship with the encoding sine wave signal; and means responsive to the output of said horizontal sync separator means for detecting the absence of a normal horizontal sync signal for momentarily displacing the operating frequency of said oscillator means for causing the phase lock loop to break lock in response to the assumption thereby of said first locked state.

* * * * *